US009387820B2

(12) United States Patent
Jordan et al.

(10) Patent No.: US 9,387,820 B2
(45) Date of Patent: Jul. 12, 2016

(54) LINING PART FOR MOUNTING ON A VEHICLE BODY PART WITH AN AIRBAG MODULE, AIRBAG SYSTEM WITH A BODY PART AND WITH SUCH A LINING PART AND METHOD FOR THE PRODUCTION OF THE LINING PART

(71) Applicant: Faurecia Innenraum Systeme GmbH, Hagenbach (DE)

(72) Inventors: Johannes Jordan, Nettetal (DE); Reiner Lillig, Kandel (DE); Dieter Löper, Karlsruhe (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 0 days.

(21) Appl. No.: 14/472,368

(22) Filed: Aug. 29, 2014

(65) Prior Publication Data

US 2015/0061266 A1    Mar. 5, 2015

(30) Foreign Application Priority Data

Aug. 29, 2013 (DE) .......................... 10 2013 014 405

(51) Int. Cl.
*B60R 21/215* (2011.01)
*B60R 13/02* (2006.01)
(Continued)

(52) U.S. Cl.
CPC ......... *B60R 21/215* (2013.01); *B29C 45/14811* (2013.01); *B60R 13/0237* (2013.01); *B60R 21/21* (2013.01); *B60R 21/213* (2013.01);
(Continued)

(58) Field of Classification Search
CPC .................. B60R 21/215; B60R 2021/21531; B60R 21/213; B60R 21/217; B60R 21/21; B60R 13/0237; B29C 45/14811; B29C 45/14065; B29C 2045/14131; B29K 2021/003; B29K 2105/253; B29L 2009/00; B29L 2031/3038
See application file for complete search history.

(56) References Cited

U.S. PATENT DOCUMENTS

| | | | | |
|---|---|---|---|---|
| 5,096,221 A | * | 3/1992 | Combs ................. | B60R 21/215 280/728.3 |
| 5,335,939 A | * | 8/1994 | Kuriyama ............. | B60R 21/215 280/728.3 |

(Continued)

FOREIGN PATENT DOCUMENTS

| | | |
|---|---|---|
| DE | 10 2007 005 016 B3 | 11/2008 |
| DE | 10 2007 053 99 A1 | 5/2009 |
| WO | WO 2009/115112 A1 | 9/2009 |

OTHER PUBLICATIONS

German Search/Examination Report for application DE 10 2013 014 405.1, dated May 7, 2014, 4 pages (not translated).

(Continued)

*Primary Examiner* — Paul N Dickson
*Assistant Examiner* — Timothy Wilhelm
(74) *Attorney, Agent, or Firm* — Reising Ethington P.C.

(57) ABSTRACT

A lining part for mounting on a vehicle body part with an airbag module, wherein the lining part includes a support part, fabric part, and protection layer. The support part has a base body with an airbag deployment opening therein. The base body includes a deployment channel wall extending from a first edge region to a second edge region. The fabric part includes a cover section extends partially over the deployment opening leaving an opening strip free up to a distance to the second edge region. The protective layer covers the deployment opening and is situated on a first surface of the fabric part.

17 Claims, 11 Drawing Sheets

(51) Int. Cl.
  *B60R 21/21* (2011.01)
  *B60R 21/213* (2011.01)
  *B60R 21/217* (2011.01)
  *B29C 45/14* (2006.01)
  *B29K 21/00* (2006.01)
  *B29K 105/00* (2006.01)
  *B29L 9/00* (2006.01)
  *B29L 31/30* (2006.01)

(52) U.S. Cl.
  CPC ......... *B60R21/217* (2013.01); *B29C 45/14065* (2013.01); *B29C 45/14786* (2013.01); *B29C 2045/14131* (2013.01); *B29C 2045/14155* (2013.01); *B29K 2021/003* (2013.01); *B29K 2105/253* (2013.01); *B29L 2009/00* (2013.01); *B29L 2031/3038* (2013.01); *B29L 2031/3041* (2013.01)

(56) References Cited

U.S. PATENT DOCUMENTS

| | | | | |
|---|---|---|---|---|
| 5,407,225 A * | 4/1995 | Cooper | ............... | B60R 21/2165 280/728.3 |
| 5,685,930 A * | 11/1997 | Gallagher | ............ | B29C 66/5326 156/272.2 |
| 5,804,121 A * | 9/1998 | Gallagher | ............ | B29C 37/0057 264/250 |
| 6,131,945 A * | 10/2000 | Labrie | ................... | B60R 21/216 280/728.3 |
| 6,318,752 B1 * | 11/2001 | Warnecke | ............. | B60R 21/205 280/728.3 |
| 6,328,367 B1 * | 12/2001 | Eichhorn | ............ | B60R 21/2165 280/728.3 |
| 6,533,312 B1 * | 3/2003 | Labrie | ................... | B60R 21/216 280/728.2 |
| 6,565,115 B2 * | 5/2003 | Streck | ................. | B60R 21/2165 280/728.3 |
| 6,719,320 B2 * | 4/2004 | Gray | ..................... | B60R 21/216 280/728.3 |
| 6,908,521 B2 * | 6/2005 | Ponthieu | ............... | B60R 21/205 156/73.5 |
| 6,929,280 B2 * | 8/2005 | Yasuda | ................... | B29C 65/06 280/728.2 |
| 7,100,941 B2 * | 9/2006 | Riha | .................. | B23K 26/4055 280/728.3 |
| 7,165,780 B2 * | 1/2007 | Segura | ............... | B60R 21/2155 280/728.3 |
| 7,178,825 B2 * | 2/2007 | Fujii | .................. | B60R 21/2155 280/728.3 |
| 7,210,700 B2 * | 5/2007 | Zagrodnicki | ......... | B60R 21/215 280/728.3 |
| 7,234,724 B1 * | 6/2007 | Cowelchuk | ........... | B60R 21/205 280/728.2 |
| 7,267,360 B2 * | 9/2007 | Geum | ................. | B60R 21/2165 280/728.2 |
| 7,478,827 B2 * | 1/2009 | Thomas | .................... | B32B 5/18 280/728.3 |
| 7,878,528 B2 * | 2/2011 | Dorn | ..................... | B60R 21/216 280/728.3 |
| 8,408,588 B2 * | 4/2013 | Wittkamp | ........... | B60R 21/2165 280/728.3 |
| 8,414,016 B2 * | 4/2013 | Buhler | ................ | B60R 21/2165 280/728.3 |
| 2004/0178609 A1 * | 9/2004 | Totsuka | ................ | B60R 21/213 280/730.2 |

OTHER PUBLICATIONS

Tech-Jam International article, retrieved on Sep. 26, 2012 from www.int.tech-jam.com/i2/measurement.phtml, 2 pages.

* cited by examiner

LINING PART FOR MOUNTING ON A VEHICLE BODY PART WITH AN AIRBAG MODULE, AIRBAG SYSTEM WITH A BODY PART AND WITH SUCH A LINING PART AND METHOD FOR THE PRODUCTION OF THE LINING PART

BACKGROUND

The invention relates to a lining part for mounting on a vehicle body part with an airbag module, an airbag system with a body part and with such a lining part and a method for the production of the lining part.

Such a lining part with an airbag cover is known from EP 0748722 B1.

SUMMARY

An object of the present invention is to provide a lining part for mounting on a vehicle body part and an airbag system with a body part and with such a lining part, which on the one hand enables a shatter protection and on the other hand enables an efficient production method.

A further object of the present invention is to provide a method for the production of the lining part according to the invention, by which the lining part can be produced in an economically effective manner and by which a high production quality of the lining part can be achieved.

This problem is solved by the features of the respective independent claims. Further embodiments are indicated in the subclaims which respectively refer back to these.

According to an aspect of the invention, a lining part is provided for mounting on a vehicle body part with an airbag module, wherein the lining part comprises a visible side, which faces an interior, and a rear side situated opposed thereto, and comprises:
 a support part, which comprises a base body extending in a planar manner, with an airbag deployment opening constructed therein, and a deployment channel wall, wherein the base body comprises a first surface situated on the visible side and wherein the deployment channel wall extends from a first edge region forming partially the airbag deployment opening, which edge region lies opposite a second edge region thereof, and projects from the base body on the rear side,
 a fabric part with a fixing section for the connection thereof with the deployment channel wall and with a cover section extending therein over the airbag deployment opening, which cover section extends from the deployment channel wall partially over the airbag deployment opening and leaving an opening strip free only up to a distance to the second edge region,
 a protective layer, which covers the airbag deployment opening and, in so doing, is situated on a first surface of the fabric part such that it is situated in the cover section on the visible side and in the fixing section for fastening thereof on the deployment channel wall between the fixing section and the deployment channel wall.

The protective layer provided according to the invention covers the airbag deployment opening completely and serves, in particular as a cover section situated on the fabric part, as a protective layer against splinter pieces which occur when the airbag pushes through the lining part. Furthermore, the same material of the protective layer is used so that the fabric part, which receives the longitudinal forces exerted onto the cover on pushing through of the airbag, adheres to a section of the deployment channel wall. It is advantageous here in particular that no adhesive is additionally necessary for the fastening of the fabric part, but rather that the adhesion forces which can be taken from the connection of the connecting region of the protective layer with the deployment channel wall for the airbag function are sufficient. Thereby, the protective layer and hence the entire cover can be produced in a simple and reliable manner.

According to an embodiment of the lining part according to the invention, provision is made that the airbag lining part comprises a positioning strip which, at a first edge section of the fabric part, is fastened thereon and runs along the first edge section of the fabric part, wherein the positioning strip is applied at an edge region of the deployment channel wall, which forms a free end of the deployment channel wall.

According to an embodiment of the lining part according to the invention, provision is made that the lining part comprises a decoration layer which is situated on a surface region of the base body surrounding the airbag deployment opening and situated on the visible side, and the cover layer of the protective layer.

Generally, provision can be made that the decoration layer is formed from or consists of a top layer or cover layer and optionally of a foam layer, which is situated between the top layer and the base body.

According to an embodiment of the lining part according to the invention, provision is made that the decoration layer comprises a weakening region which runs along the second edge region of the base body.

According to an embodiment of the lining part according to the invention, provision is made that the protective layer is formed from TPE.

According to an embodiment of the lining part according to the invention, provision is made that the protective layer consists of TPE.

According to an embodiment of the lining part according to the invention, provision is made that the fabric part is formed from a fabric, and in particular from PES.

According to an embodiment of the lining part according to the invention, provision is made that the protective layer penetrates the fabric part for the formation of a composite material.

According to a further aspect of the invention, an airbag system is provided with a body part, with an airbag module mounted thereon and with a lining part according to one of the preceding claims.

In the airbag system, provision can be made that the airbag system is a side airbag system.

According to a further aspect of the invention, a method for the production of a lining part with a support part, which comprises a base body, extending in a planar manner, with an airbag deployment opening constructed therein for the deployment of an airbag, and a deployment channel wall arranged at a first edge region of the base body, the method having the steps:
 into a first tool part of a forming tool, inserting of the support part with a fabric part with a fixing section, which lies against the deployment channel wall, and with a cover section extending in the deployment opening, which cover section rests on a section of the first tool part and extends from the deployment channel wall partially over the airbag deployment opening and leaving free an opening strip only up to a distance to a second edge region, which lies in relation to the deployment opening opposite the first edge region of the base body, closing of the forming tool by moving together the first tool part and a second tool part, wherein the second tool part leaves free a cavity extending over the deployment opening, introducing of coating material into the cavity, wherein the introduction of the coating material into the cavity takes place at a site on the support part which, viewed from the second edge region of the base body, is situated behind the first edge region, so that coating material fills the cavity and, in so doing, forms a protective layer, which covers the airbag deployment opening, wherein the latter is situated on a first surface of the fabric part, such that it is situated in the cover section on the visible side and in the fixing section for the fastening thereof on the deployment channel wall between the fixing section and the deployment channel wall.

According to an embodiment of the method according to the invention, provision is made that with the fastening of the fabric part, the fabric part is situated with a first edge section on an outer edge section of the end of the deployment channel wall projecting from the base body.

According to an embodiment of the method according to the invention, provision is made that with the fastening of the fabric part, a positioning strip is fastened on a first end thereof, which positioning strip is applied to an outer edge section of the end of the deployment channel wall projecting from the base body, in order to align the fabric part with the deployment channel wall.

According to an embodiment of the method according to the invention, provision is made that a decoration layer is held on the second tool part and the cavity existing with the tool parts moved together is formed in the region of the deployment opening by surfaces of the fabric part and of the decoration layer facing one another.

According to an embodiment of the method according to the invention, provision is made that the first tool part comprises projections which form depressions into the decoration layer, when the tool parts are in the moved-together state.

BRIEF DESCRIPTION OF THE DRAWINGS

Embodiments of the invention are described below with the aid of the enclosed figures, which show.

DETAILED DESCRIPTION

The lining part according to the invention is provided for mounting on a vehicle body part with an airbag module and can therefore also be designated as an airbag lining part. The vehicle body part can generally be an A-column, a B-column or a C-column of a vehicle body. The vehicle body part here can also be a door frame, so that the lining part according to the invention can be used as lining of a door side airbag system.

Figure 1:
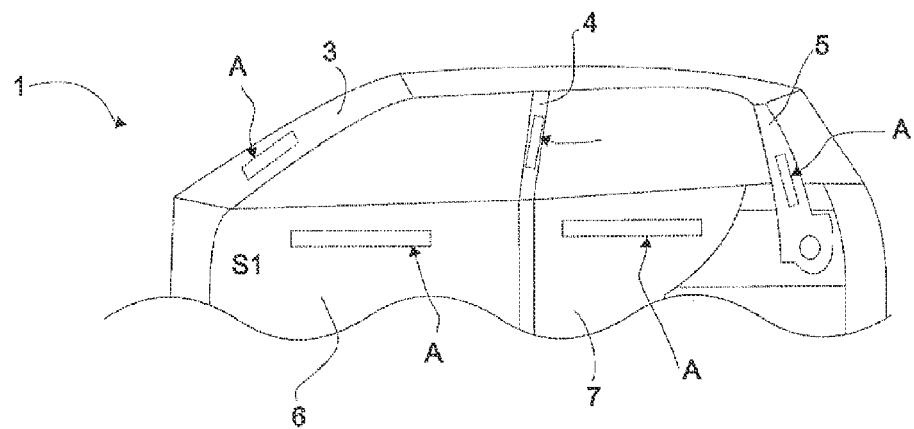
FIG. 1 a greatly simplified and diagrammatic side view of a cutout of a side region of a vehicle body, which is formed from vehicle body parts such as e.g. an A-column, a B-column and a C-column, wherein the side view is produced in the direction of viewing from the interior of the vehicle body, FIG. 2 a perspective view of a visible side of an embodiment of the lining part according to the invention, which is provided for mounting on a vehicle body part, wherein the lining part is formed from a support part and a decoration layer coating the latter, and wherein a deployment channel wall concealed by the decoration layer is recorded by dashed lines, FIG. 3 a perspective sectional illustration of a cutout of the lining part illustrated in FIG. 2, wherein the sectional illustration is produced as a section along the line L3-L3, which is recorded in FIG. 2, FIG. 4 a perspective view of a visible side of the support part of the lining part of FIG. 2 as an intermediate product, wherein the illustrated intermediate product is formed from a base body with an airbag deployment opening and a deployment channel wall surrounding the latter, FIG. 5 the support part of FIG. 4 in the manner of representation of FIG. 4, wherein a fabric part, provided according to the invention, is arranged on the deployment channel wall, FIG. 6 a perspective view of the rear side of the intermediate product illustrated in FIG. 3, on which the fabric part is fastened by means of a positioning strip, FIG. 7 a perspective sectional illustration of a cutout of a further embodiment of the lining part according to the invention, which differs from the lining part illustrated in FIG. 2 in that the fabric part is not fastened on the deployment channel wall by means of a positioning strip, wherein the sectional illustration is produced in an analogous manner from a section along the line L3-L3, which is recorded in FIG. 2, FIG. 8 the embodiment of the lining part, illustrated in FIG. 7, in the illustration of FIG. 6, FIG. 9 a sectional illustration of a production device for the production of an embodiment of the lining part according to the invention, wherein the production device is shown in a first method step, in which the production device is situated in the open state and the base body, as a section along the line L3-L3 in FIG. 2, is inserted into the production device, FIG. 10 the production device of FIG. 9 in a second method step, in which the production device is situated in the open state and, compared with the state of FIG. 9, in addition the fabric part is fastened by means of a positioning strip on the deployment channel wall, FIG. 11 the production device of FIG. 9 in a third method step in which, compared with the state of FIG. 10, the production device is situated in the closed state, wherein coating material is provided in a reservoir, FIG. 12 the production device of FIG. 9 in a fourth method step, in which the production device is situated in the closed state and, compared with the state of FIG. 11, in addition coating material is introduced to the fabric part from a reservoir and therefore in addition a protective layer is applied onto the fabric part, FIG. 13 the production device of FIG. 9 in a first method step of a further embodiment of the method according to the invention, in which a lining part is produced with an additional decoration layer, wherein in the illustrated method step the production device is situated in the open state and the decoration layer is arranged on the support part, and FIG. 14 the production device of FIG. 9 in a further method step with respect to FIG. 13 of the further embodiment of the method according to the invention, wherein the production device is situated in the closed state and with respect to the state of FIG. 13 in addition a protective layer is applied onto the fabric part.

In FIG. 1 an illustration is represented diagrammatically of a cutout of a vehicle body 1, which is formed form several load-bearing vehicle body parts. Designated as an example in FIG. 1 are: an A-column 3, a B-column 4, a C-column 5, a front side door frame 6 and a rear side door frame 7. In the illustrated example embodiment of the vehicle body 1, in each of these vehicle body parts respectively a deployment opening A is marked by dashed lines, which is provided so that an airbag of an airbag module, which is mounted on a respective vehicle body part, can be shot through it.

The embodiments of the lining part illustrated in FIGS. 2 to 7 serves, according to its shape, for covering a C-column 5 and is an example of a general lining part for mounting on a vehicle body part.

Figure 2:
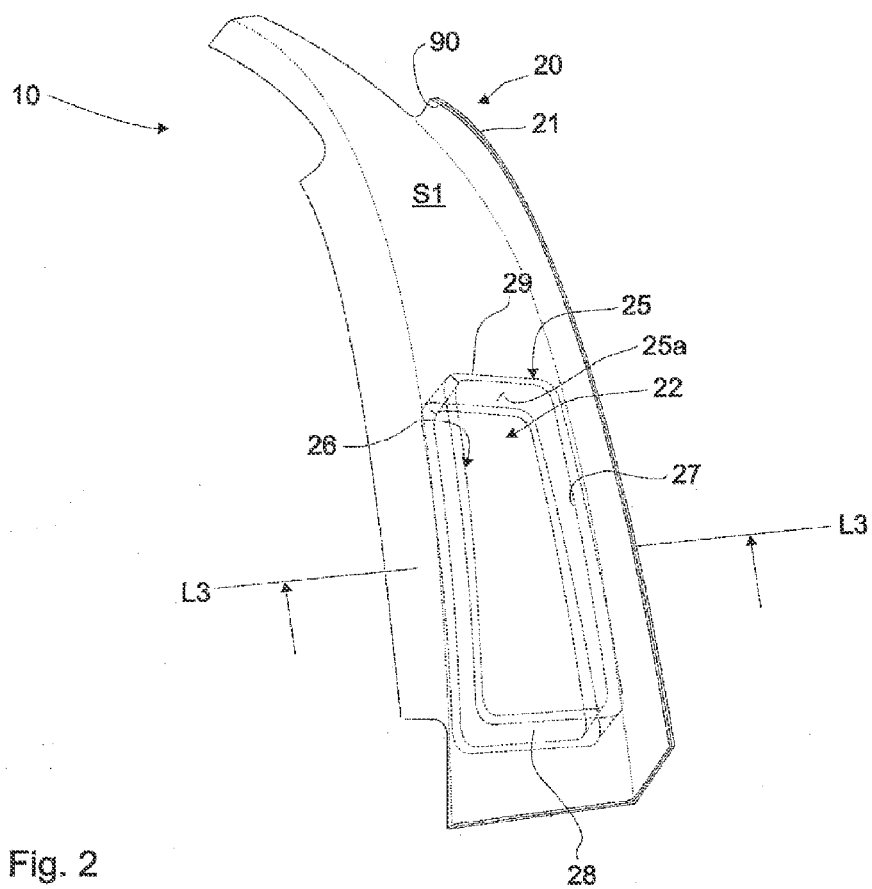

The lining part 10 comprises a visible side S1, which faces an interior, and a rear side S2 situated opposed thereto. The lining part 10 comprises a support part 20, which is formed from a base body 21, extending in a planar manner, with an airbag deployment opening 22 constructed therein, and a deployment channel wall 25. The support part 20 comprises a first surface 21a situated on the visible side S1 and a second surface 21b, situated on the rear side S2, which second surface is situated opposed to the first surface 21a. The support part can be coated at least partially on the visible side S1 with a decoration layer 90, wherein the decoration layer 90 is situated on the first surface 21a of the support part 20. In FIG. 2, an embodiment of the lining part 10 with a decoration layer 90 is illustrated, wherein to illustrate the deployment channel wall 25, this is entered into the illustration by dashed lines.

Figure 3:
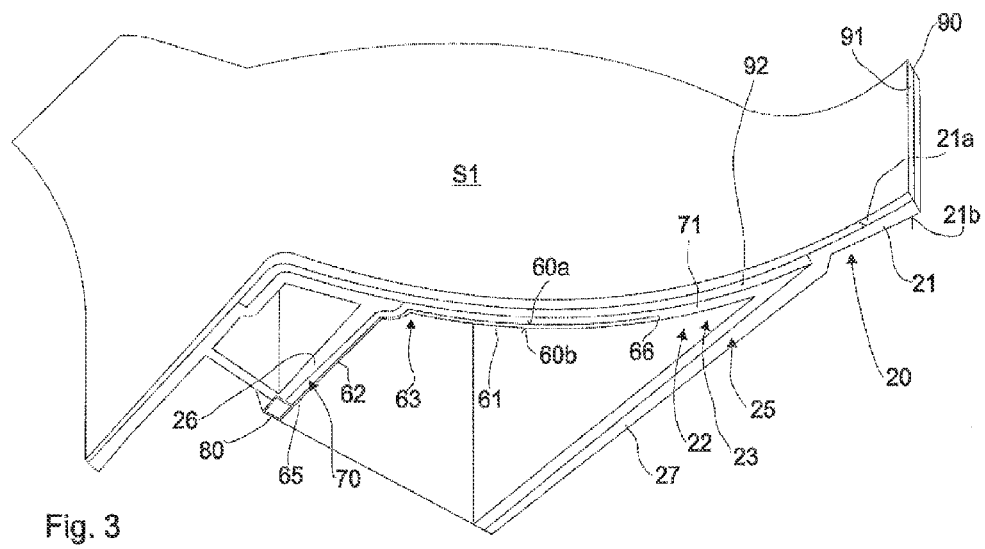
Figure 4:
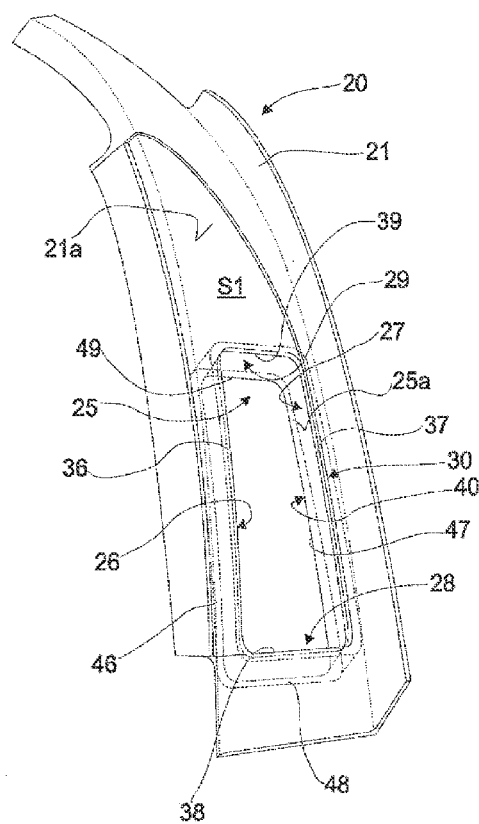
Figure 7:
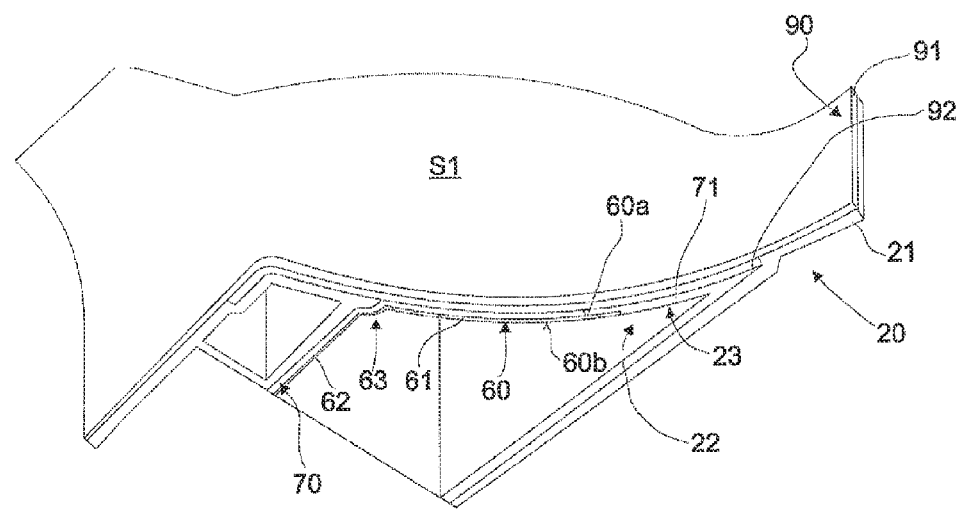

The deployment channel wall 25, which is also shown as a partial section in FIGS. 3 and 7, serves as a guide for the movement of an airbag, which is shot from an airbag module through the airbag deployment opening 22. In the illustrated embodiments of the lining part 10, the deployment channel wall 25 is embodied as a circumferential channel wall, which comprises a first longitudinal wall 26 and a second longitudinal wall 27, which run along with respect to one another. Furthermore, the deployment channel wall 25 comprises a first side wall 28 and a second side wall 29, which run along with respect to one another. Respectively one of the side walls 28, 29 connects the longitudinal walls 26, 27 with one another at their lateral ends.

A first upper edge region 36 of the base body 21 situated at the airbag deployment opening 22 forms a transition between the base body 21 and the first longitudinal wall 26 of the deployment channel wall 25. The first edge region can be designated as "upper" edge region, because it is situated on the visible side S1. In an analogous manner, a second upper edge region 37 of the base body 21 situated at the airbag deployment opening 22 forms a transition between the base body 21 and the second longitudinal wall 27 of the deployment channel wall 25. Furthermore, in an analogous manner hereto, a third upper edge region 38 and a fourth upper edge region 39 of the base body 21 respectively form a transition between the base body 21 and the first side wall 28 or respectively the second side wall 29 of the deployment channel wall 25. In the illustrated embodiment of the lining part 10, the edge regions 36, 37, 38, 39 form together a continuous upper edge region 30, which runs around the airbag deployment opening 22.

In an alternative embodiment, the deployment channel wall 25 can be formed only from the first longitudinal wall 26 as a single longitudinal wall. Generally, the deployment channel wall 25 is formed at least from the first longitudinal wall 26. The deployment channel wall 25 comprises an inner surface 25a, which is situated on the side of the deployment opening 22 and facing the latter.

The deployment channel wall 25 projects on the rear side S2, i.e. from the second surface 21b of the base body 21, from the latter (FIGS. 5 and 8) and extends from the upper edge region 30 to a lower edge region 40, which forms the free lower end of the deployment channel wall 25. The lower edge region 40 is formed in an analogous manner to the components of the upper edge region 30: a first lower edge region 46 at the lower end of the first longitudinal wall 26, a second lower edge region 47 at the lower end of the second longitudinal wall 27, a first lower side edge region 48 at the lower end of the first side wall 28 and a first lower side edge region 49 at the lower end of the first side wall 29.

Figure 5:
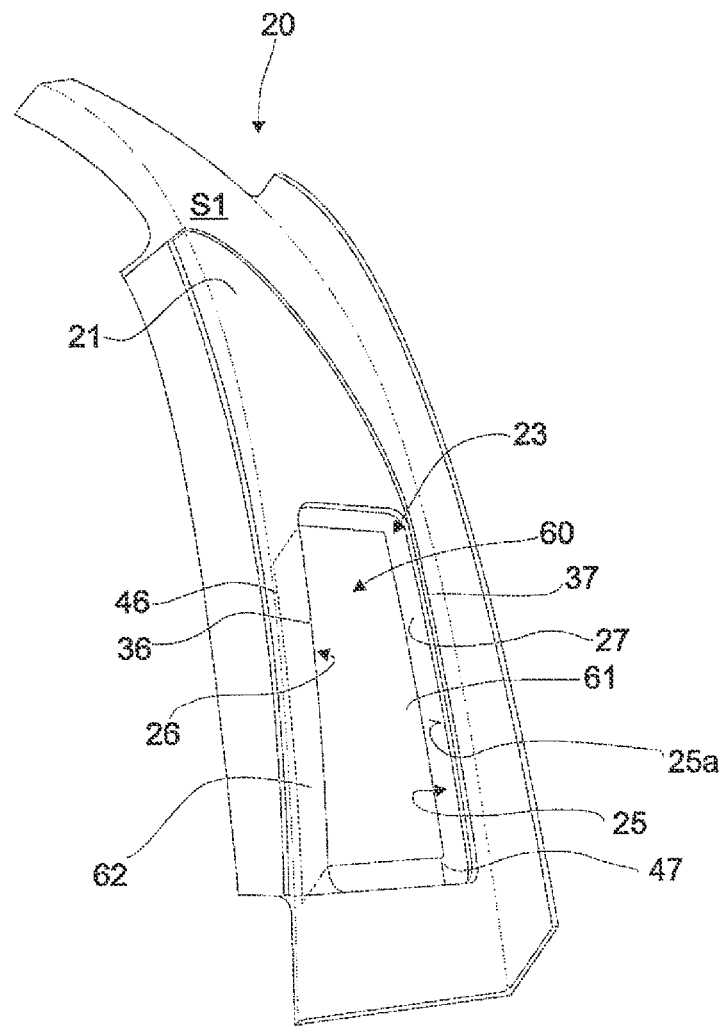
Figure 8:
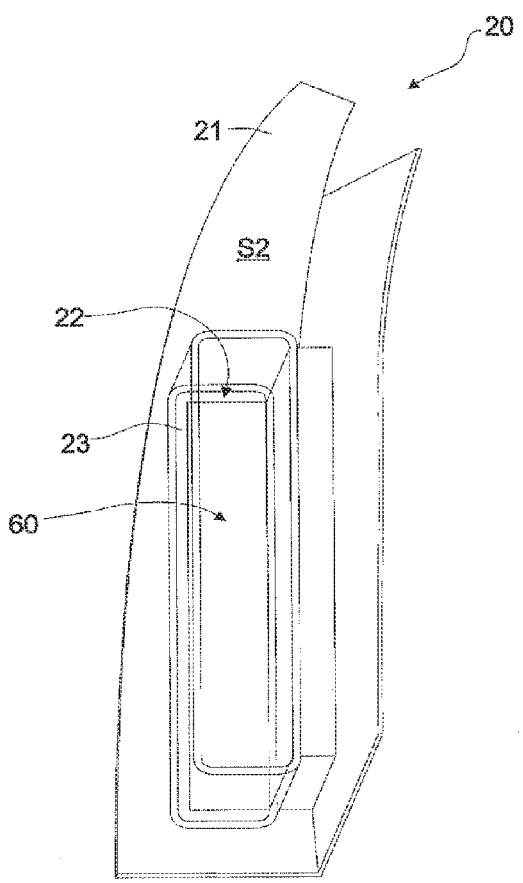

According to the invention, a fabric part 60 is fastened to the first longitudinal wall 26, which fabric part comprises a first surface 60a and a second surface 60b situated opposed thereto. In FIGS. 5 and 8 respectively an embodiment of the support part 20 is illustrated, in which diagrammatically only one fabric part 60 is arranged. The fabric part 60 is formed in its planar extent from a cover section 61 and a fixing section 62, wherein the cover section 61 continues via a transition section 63 into the fixing section 62. With the fixing section 62, the fabric part 60 is connected in a planar manner with the first longitudinal wall 26, so that the transition section 63 of the fabric part 60 forms a hinge region, by which the cover section 61 is movable as a pivotable flexible flap. The cover section 61 projects from the first edge region 36 of the base body 21 or from the first longitudinal wall 26 into the deployment opening 22. The fabric part 60 is configured here in particular in such a manner and is mounted on the deployment channel wall 25 and in particular on the first longitudinal wall 26 such that the cover section 61 extends from the deployment channel wall 25, partially over the airbag deployment opening 22 and leaving free an opening strip 23, only up to a distance d to the second edge region 37.

The opening strip 23 can be provided in particular such that the smallest distance d is at a maximum 50% and at a minimum 1% of the maximum distance between sites, facing one another, of the opposed upper edge regions 36, 37. The distance d is understood to mean the shortest distance between sites, facing one another, of the fabric part 60 and of the second edge region 37. The "smallest distance d" is additionally understood to mean the smallest distance according to amount of all such distances d coming into consideration (FIG. 5).

The fabric part 60 is arranged on the support part 20 such that the first surface 60a of the fabric part 60 is situated in the region of the cover section 61 on the visible side S1.

The fabric part 60 comprises at a first end a first edge section 65 and at a second end a second edge section 66, which is situated opposed to the first edge section 65. In the embodiments of the lining parts, the fabric part 60 can be arranged on the support part such that the first edge section 65 of the fabric part 60 is situated at the first lower edge region 46 at the lower end of the first longitudinal wall 26 and in so doing runs along the first lower edge region 46.

The fabric part 60 is coated on the first surface 60a with a protective layer 70. Furthermore, the protective layer 70 is arranged such that it covers the airbag deployment opening 22, in particular completely. The protective layer 70 comprises a cover layer 71 here, which extends from a connecting layer 72, with which the fixing section 62 is coated, on the visible side S1 beyond the cover section 61 of the fabric part 60 and beyond the fabric part 60 up to the second edge region 37 of the airbag deployment opening 22 or of the base body 21 of the support part 20 and is connected with the second edge region 37.

The fabric part 60 forms together with the protective layer 70 a covering flap or an airbag flap, which an airbag pushes through due to its activation. Through the fact that the fabric does not cover the opening strip 23, it is not necessary to provide the covering flap in particular in the region of the opening strip 23 with a weakening line or a partial material weakening. Optionally, such a weakening, in particular of the protective layer 70, can be provided.

The cover section 61 is therefore covered with the protective layer 70. Furthermore, the fixing section 62 is coated with the connecting layer 72.

In the embodiment of the lining part 10, in which the cover section 61 extends from the deployment channel wall 25 only partially over the airbag deployment opening 22 and leaving free an opening strip 23, the protective layer 70 extends over the opening strip 23 and covers the latter. Here, the cover layer 71 is situated with a partial section 73 on the fabric part 60, whilst a second partial section 74 extends over the opening strip 29 and covers the latter.

The protective layer 70 is preferably formed from a soft material. Thereby, the protective layer 70 is suited to receive splinter pieces which can arise on the explosion of the explosive charge for the deployment of the airbag of the airbag module. In particular, the protective layer 60 can be formed from TE or can consist of TE.

The protective layer 70 is preferably formed from an in particular soft material, which is suited such that the protective layer 70 only adheres with adhesion force on the fabric part 60 and on the deployment channel wall 25. This adhesion is provided such that by means of the connecting layer 72 the fabric part 60 adheres thereon. The material of the protective layer 70 is preferably selected such that it comprises no adhesive effect, so that in this case it is not stuck either to the fabric part 60 or to the deployment channel wall 25.

Figure 6:
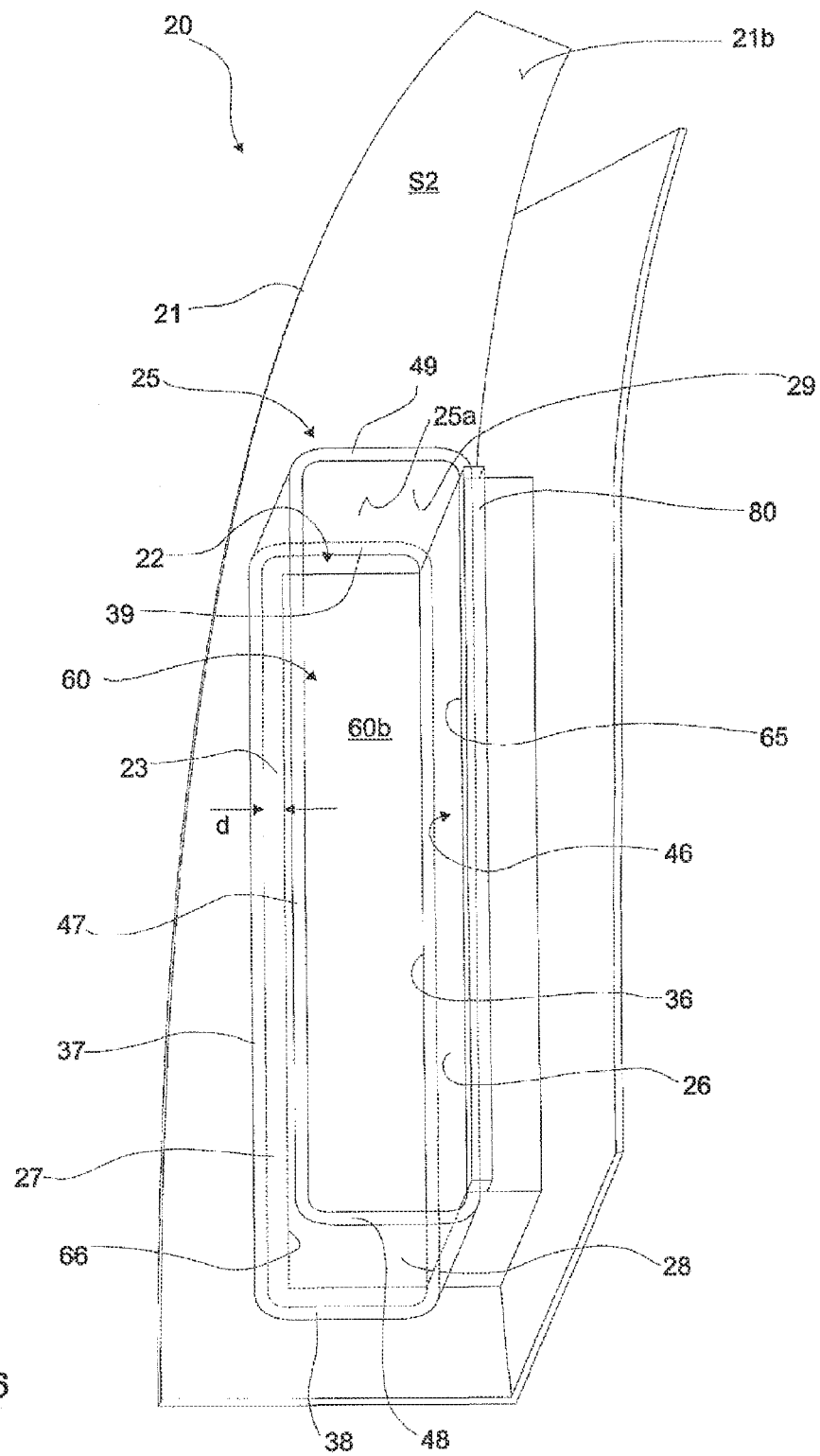

Provision can be made here, as illustrated in the embodiments of the lining part 10 of FIGS. 3 and 6, that a strip 80 is mounted on the first edge section 65. This can be embodied in particular as a positioning strip which—before the formation of the protective layer—serves such that on the installation of the lining part, the fabric part 60 can be arranged with its first edge section 65 in a clear and reliable manner on the lower edge region 46 of the deployment channel wall 25.

However, the strip 80 does not have to be present on the lining part 10. Alternatively or additionally, the fabric part 60 can also be fastened in a manner according to the invention in a different way on the wall section 26—before the formation of the protective layer—, e.g. by gluing in places or in a laminar manner on the wall section 26 or by fixing on the wall section 26 by means of a fixing element, such as e.g. clips. Provision can be made here, as illustrated in the embodiments of the lining part 10 of FIGS. 3 and 6, that a strip 80 is mounted on the first edge section 65.

The decoration layer 90 comprises a top layer 91. Here, the decoration layer 90, as shown in the embodiments of FIGS. 3 and 7, can also be formed at least partially from an intermediate layer 92 situated between the top layer 91 and the base body 21. The intermediate layer 92 can be, in particular, a foam layer 92, by which partially a predetermined haptic characteristic of the decoration layer 90 can be partially achieved.

In the method according to the invention for the production of a lining part 10 according to one of the embodiments of the invention, the support part 20 is inserted with a fabric part 60 into a first tool part 110 of a forming tool 100. The forming tool 100 is formed from the first tool part 110 and from a second tool part 120. The first tool part 110 comprises a first contour-forming surface 110a and the second tool part 120 comprises a second contour-forming surface 120a. A suction device 111 can be integrated in the first tool part 110, by which a semi-finished product placed on the first contour-forming surface 110a can be pressed against it and therefore fixed thereon. Furthermore, a suction device 121 can be integrated in the second tool part 120, by which a semi-finished product placed on the second contour-forming surface 120a can be pressed against it and can therefore be fixed thereon. Alternatively or additionally to the suction devices, other fixing devices can also be integrated therewith, e.g. mechanical holders such as clamping devices. Furthermore, an injection moulding device 115 with a feed line 116 is arranged on the first tool part 110, by which coating material can be directed onto the first contour-forming surface 110a.

Figure 9:
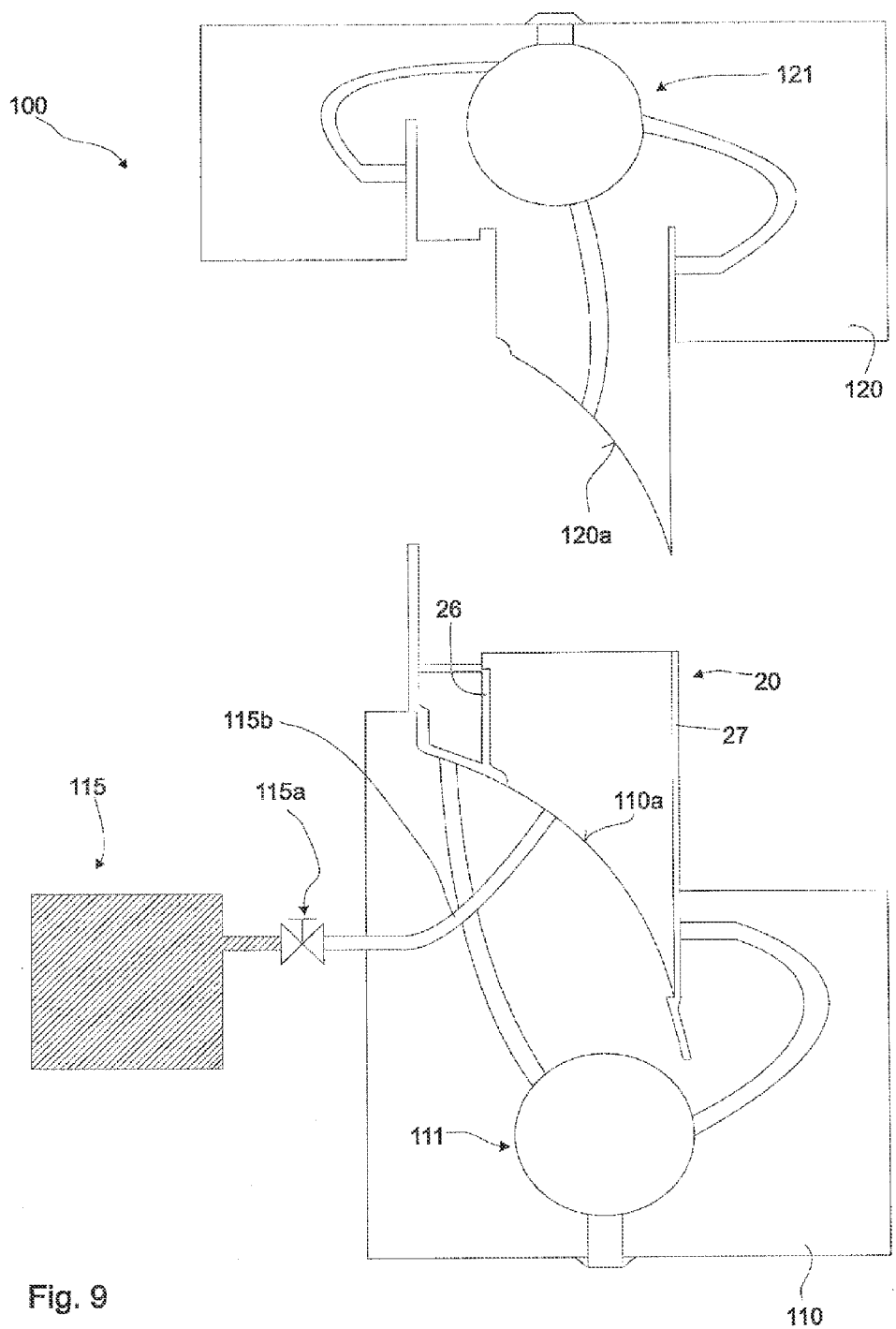

In FIG. 9 the state is shown in which only the support part 20 comprises been positioned on the first tool part 110, and the tool parts 110, 120 are situated in an open state.

Figure 10:
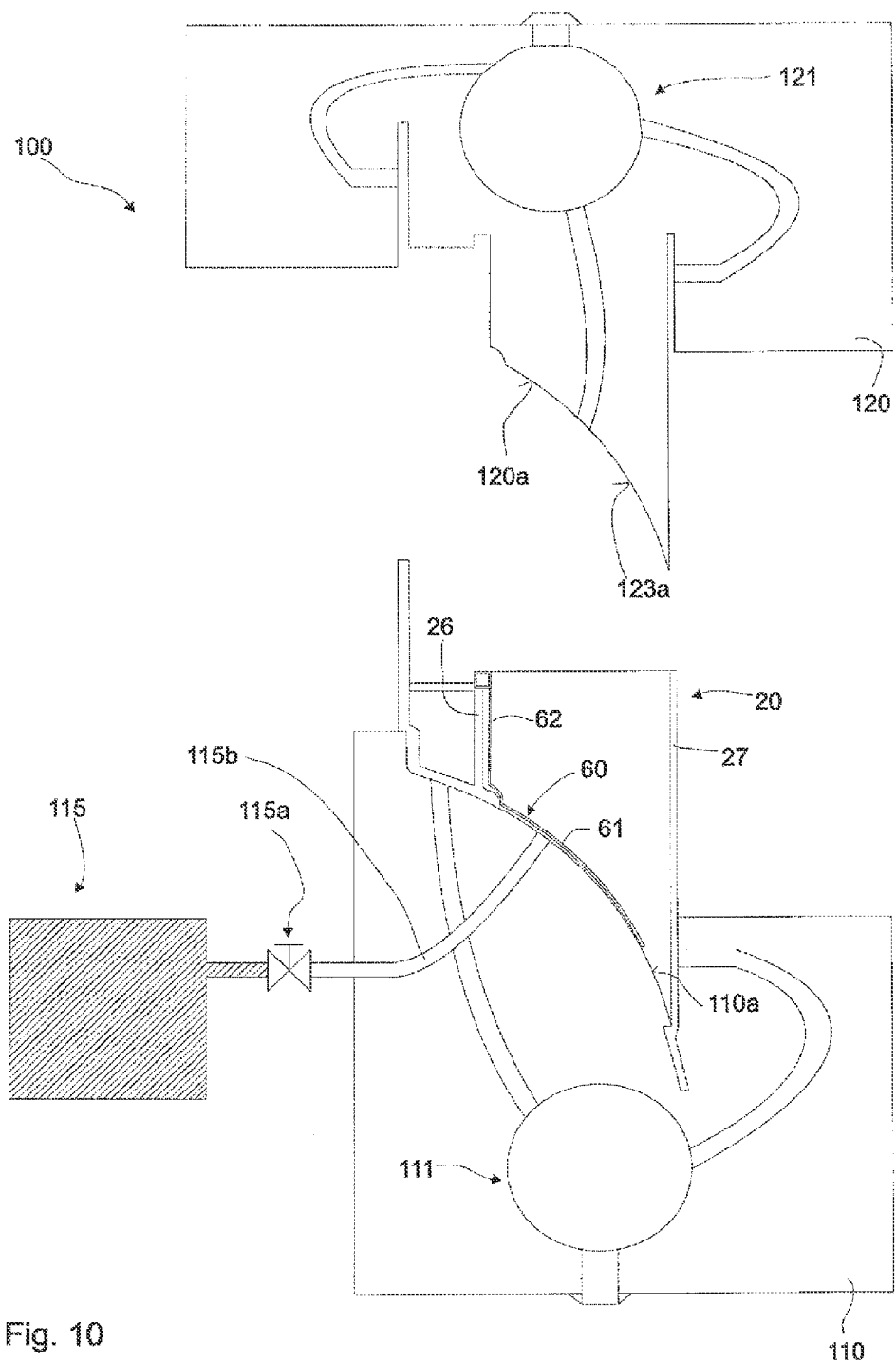

FIG. 10 shows the state in which a fabric part 60 is arranged on the support part 20 which is positioned on the first tool part 110, and the tool parts 110, 120 are situated in an open state.

The fabric part 60 of the support part 20 inserted into the first tool part 110 comprises a fixing section 62, which lies against the deployment channel wall 25, and a cover section 61 extending in the deployment opening 22, which rests on a section of the first tool part and extends from the deployment channel wall 25 partially over the airbag deployment opening 22 and leaving free an opening strip only up to a distance d to the second edge region 37. This state is illustrated on the support part 20 in FIGS. 6 and 8 and as a method step in FIG. 10.

Figure 11:
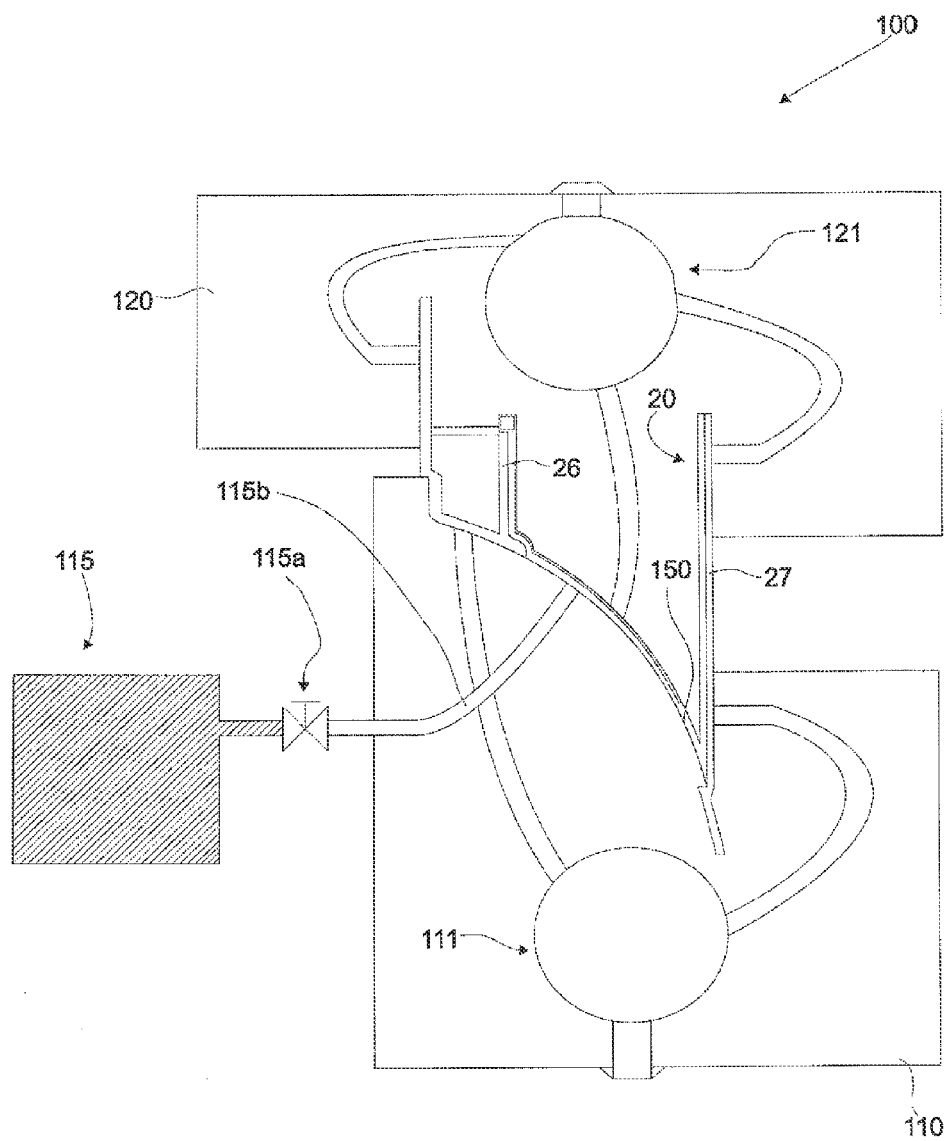

In a further step, a closing of the forming tool 100 takes place by moving together the first tool part 110 and the second tool part 120, wherein the second tool part 120 leaves free a cavity 150 extending over the deployment opening 22. This state is illustrated in FIG. 11.

In FIGS. 9 to 12, a device is illustrated for the introducing of coating material with a reservoir 115 and a feed line 115b, which opens out in a region of the first tool part 110 at which the coating material is to be introduced for coating the semi-finished product combination situated between the tool parts 110, 120. This introduction site can also be provided at other locations, according to the shape of the lining part which is to be produced. Provision can also be made that the feed line 115b opens out at several sites on the first tool part 110. It is illustrated in 9 to 11 that the coating material is still situated in the reservoir 115.

Figure 12:
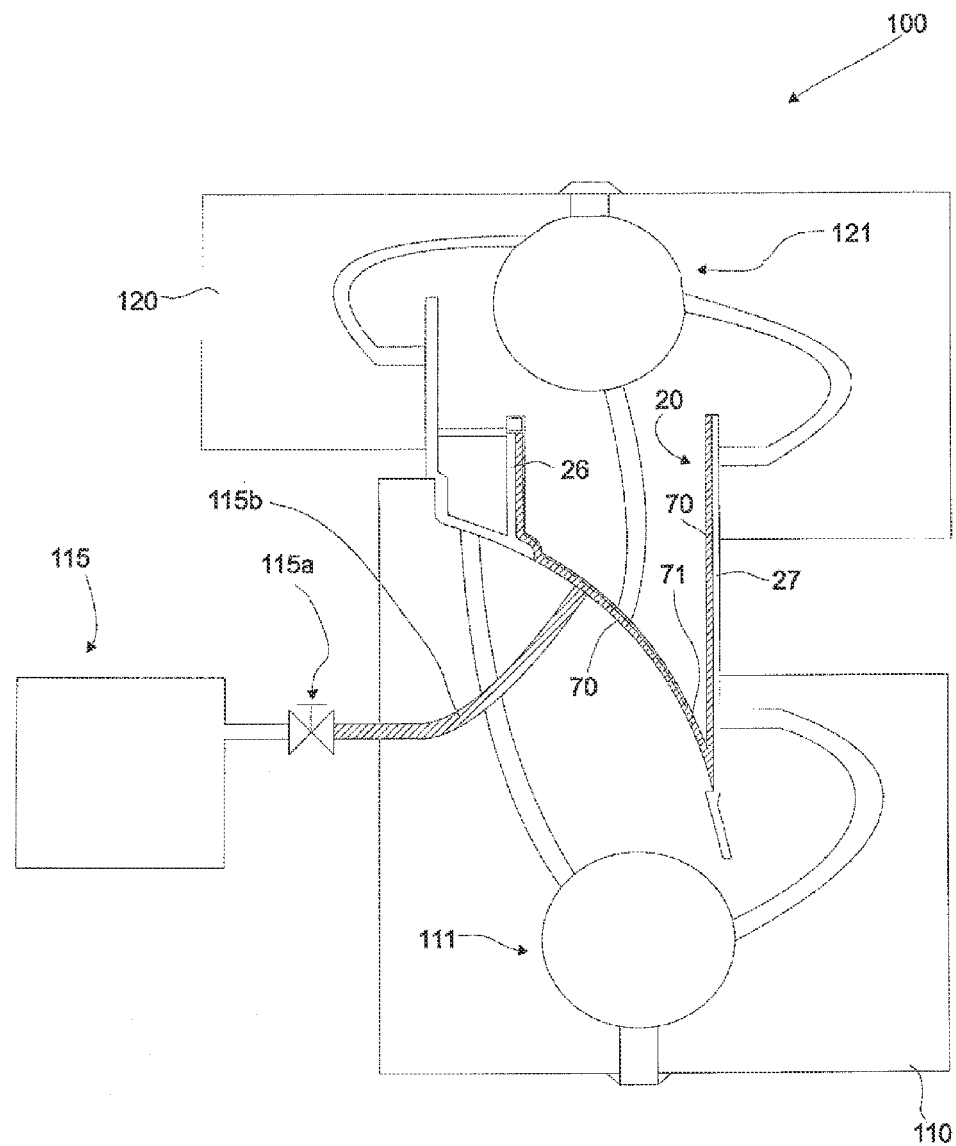

Subsequently, coating material is introduced into the cavity 150, wherein the introduction of the coating material into the cavity 150 takes place at a location on the support part 20 which, viewed from the second upper edge region 27, is situated behind the first upper edge region 26, so that coating material on the one hand fills the cavity 150 and forms the protective layer 70, which covers the airbag deployment opening 22 and in so doing is situated on a first surface 60a of the fabric part 60 such that the latter is situated in the cover section 61 on the visible side S1 and in the fixing section 62 for fastening thereof to the deployment channel wall 25 between the fixing section 62 and the deployment channel wall 25. This state is illustrated on the support part 20 in FIGS. 3 and 7 and as a method step in FIG. 12. In FIG. 12, in a simplifying manner it is also illustrated that the coating material comprises left the reservoir 115. During the introduction of the coating material for the formation of the protective layer 70, the fabric part 60 is pressed against a corresponding section 123a of the second tool part 120. The coating material, situated on corresponding surface regions of the support part 20, is illustrated by hatching in FIG. 12. As illustrated by means of the hatching for the illustration of the coating material, the fabric part 60 can be provided such that the coating material impregnates the fabric part 60. Thereby, the material characteristic can be adapted and optimized with regard to the cover flap of the lining part which is to be produced.

In the embodiments of the method according to the invention, provision can be made that the fastening of the fabric part 60 is embodied such that it is situated with a first edge section 65 on an outer edge section 46 of the end of the deployment channel wall 25 projecting from the base body.

Furthermore, with the fastening of the fabric part 60 on a first edge section 65 thereof a positioning strip 80 can be fastened, which is applied on an outer edge section 46 of the end of the deployment channel wall 25 projecting from the base body 21, in order to align the fabric part 60 on the deployment channel wall 25.

Figure 13:
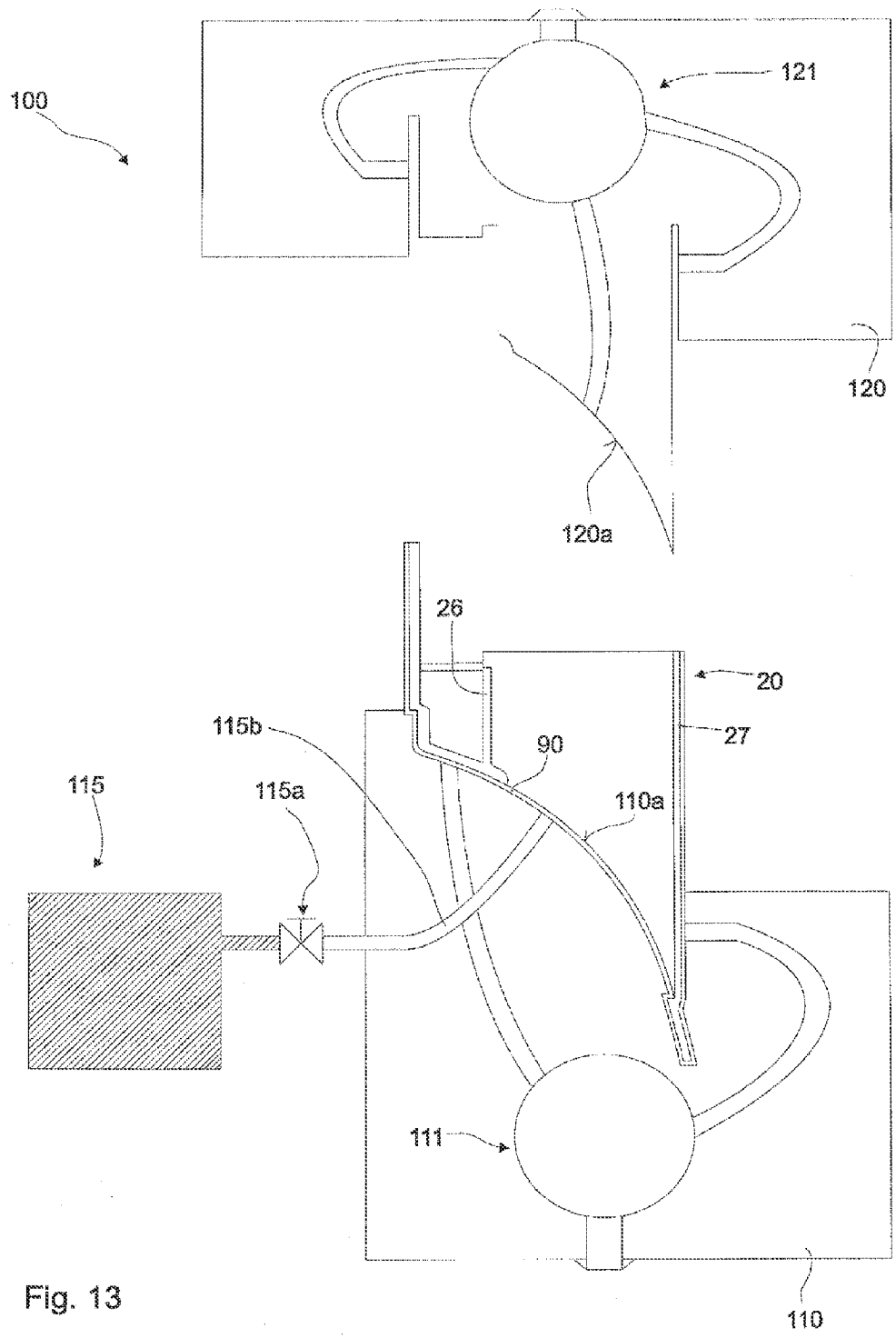
Figure 14:
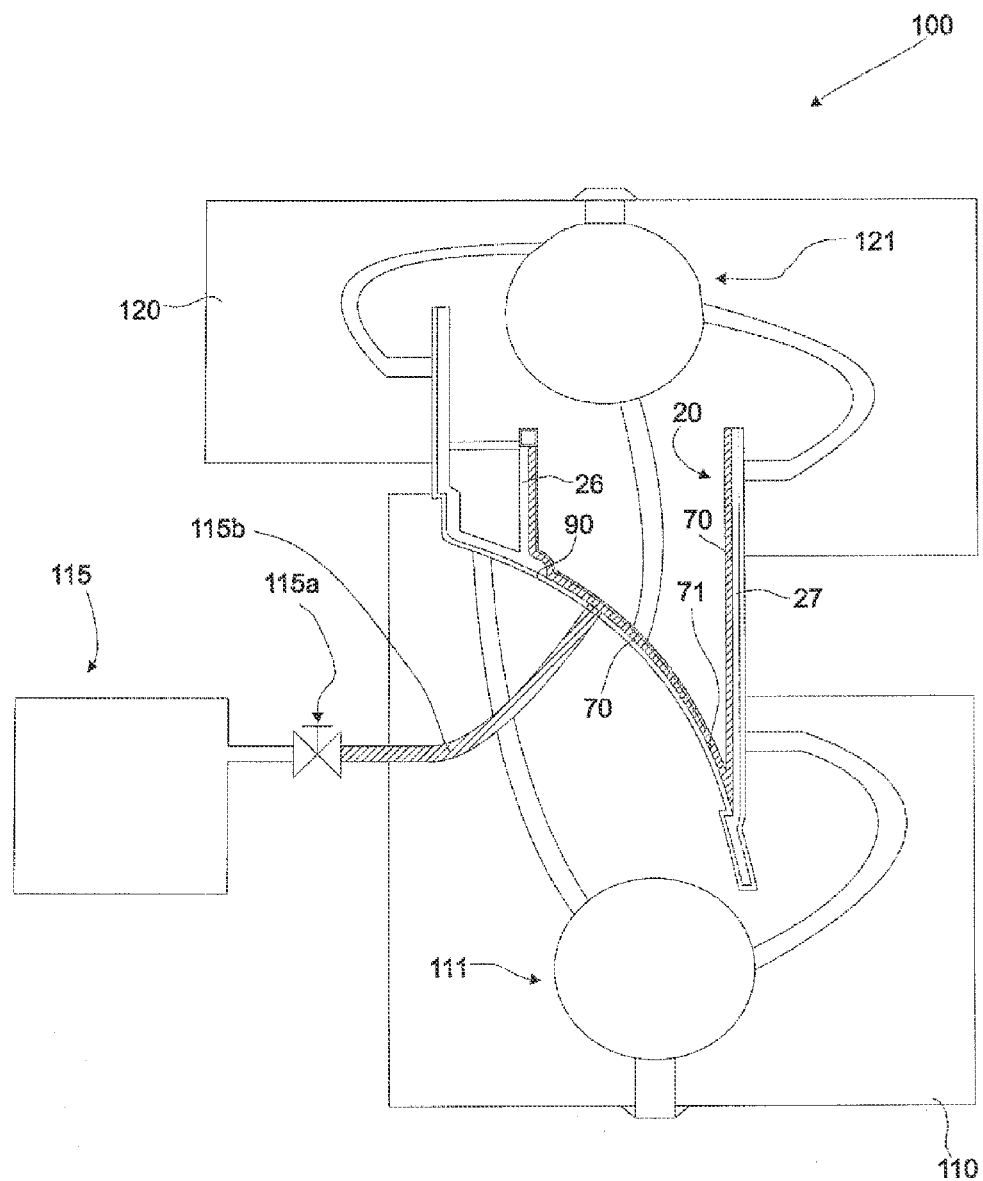

To form a decoration layer 90 on the support part 20, provision is made that before the closing of the tool parts 110, 120 a decoration layer 90 is held on the first tool part 110. This state of such an embodiment of the method according to the invention with the use of a decoration layer 90 is shown in FIG. 13. In this embodiment, the decoration layer 90 is constructed as a film and is already mounted on the support part 20, e.g. by the decoration layer 90 being glued or laminated on a surface of the support part 20. The decoration layer 90 can also, as comprises already been stated, be formed from several layers. FIG. 14 shows in this embodiment the state in which coating material comprises been introduced between the support part 20 and the fabric part 60.

In a further embodiment of the method with a formation of a decoration layer 90 on the support part 20, provision can be made that the first tool part comprises projections which form depressions in the decoration layer 90 when the tool parts are situated in the moved-together state.

REFERENCE NUMBERS

A deployment opening
S1 lining part visible side (facing the interior)
S2 lining part rear side (facing away from the interior)
1 vehicle body
3 A-column
4 B-column
5 C-column
6 front side door frame
7 rear side door frame
10 lining part
20 support part
21 base body
d distance fabric part to support part
21a first surface situated on the visible side S1
21b second surface situated on the rear side S2
22 airbag deployment opening
23 opening strip
25 deployment channel wall
25a
26 first longitudinal wall
27 second longitudinal wall
28 first side wall
29 second side wall
30 continuous upper edge region
36 first upper edge region
37 second upper edge region
38 third upper edge region
39 fourth upper edge region
40 lower edge region
46 first lower edge region
47 second lower edge region
48 first lower side edge region
49 second lower side edge region
60 fabric part
60a first surface fabric part
60b second surface fabric part
61 cover section
62 fixing section
63 transition section
65 first edge section
66 second edge section
70 protective layer
71 cover layer
72 connecting layer
73 first partial section
74 second partial section
80 strip
90 decoration layer
91 cover layer
92 intermediate layer (foam layer)
100 forming tool
110 first tool part
110a first contour-forming surface
111 suction device
115 injection moulding device
115a valve
115b feed line
120 second tool part
120a second contour-forming surface
121 suction device
123a section of the second tool part
150 cavity

The invention claimed is:

1. A lining part for mounting on a vehicle body part with an airbag module, wherein the lining part comprises a visible side, which faces an interior, and a rear side situated opposed thereto, and comprises:
a support part, which comprises a base body extending in a planar manner, with an airbag deployment opening constructed therein, and a deployment channel wall, wherein the base body comprises a first surface situated on the visible side, wherein the deployment channel wall extends from a first edge region forming partially the airbag deployment opening, which edge region lies opposite a second edge region thereof, and projects from the base body on the rear side,
a fabric part with a fixing section for the connection thereof with the deployment channel wall and with a cover section extending therein over the airbag deployment opening, which cover section extends from the deployment channel wall partially over the airbag deployment opening and leaving an opening strip free of the fabric part across a distance to the second edge region, wherein the fabric part comprises a first surface which faces the visible side in the area of the cover section,
a protective layer, which covers the airbag deployment opening and, in so doing, is connected at the first surface of the fabric part to the fabric part, wherein the protective layer extends between the fixing section and the deployment channel wall and is fixed to both the fixing section and the deployment channel wall.

2. The lining part according to claim 1, wherein the airbag lining part comprises a positioning strip which, at a first edge section of the fabric part, is fastened thereon and runs along the first edge section of the fabric part, wherein the positioning strip is applied at an edge region of the deployment channel wall which forms a free end of the deployment channel wall.

3. The lining part according to claim 1, wherein the lining part comprises a decoration layer which is situated on a surface region of the base body surrounding the airbag deployment opening and situated on the visible side, and the cover layer of the protective layer.

4. The lining part according to claim 1, wherein the decoration layer comprises a weakening region which runs along the second edge region of the base body.

5. The lining part according to claim 1, wherein the protective layer is formed from TPE.

6. The lining part according to claim 1, wherein the protective layer consists of TPE.

7. The lining part according to claim 1, wherein the fabric part is formed from a fabric.

8. The lining part according to claim 1, wherein the protective layer penetrates the fabric part.

9. An airbag system with a body part, with an airbag module mounted thereon and with a lining part according to claim 1.

10. The airbag system according to claim 9, wherein the airbag system is a side airbag system.

11. The lining part according to claim 1, wherein the distance to the second edge region comprises between 1 percent and 50 percent of a maximum distance between the first edge region and the second edge region.

12. The lining part according to claim 1, wherein the cover section of the fabric layer extends at least halfway from the deployment channel wall to the second edge region.

13. A method for the production of a lining part with a support part, which comprises a base body, extending in a planar manner, with an airbag deployment opening constructed therein for the deployment of an airbag, and a deployment channel wall arranged at a first edge region of the base body, the method having the steps:

into a first tool part of a forming tool, inserting of the support part with a fabric part with a fixing section, which lies against the deployment channel wall, and with a cover section extending in the deployment opening, which cover section rests on a section of the first tool part and extends from the deployment channel wall partially over the airbag deployment opening and leaving free an opening strip only up to a distance to a second edge region, which lies opposite the first edge region of the base body, closing of the forming tool by moving together the first tool part and a second tool part, wherein the second tool part leaves free a cavity extending over the deployment opening, introducing of coating material into the cavity, wherein the introduction of the coating material into the cavity takes place at a site on the support part which, viewed from the second edge region, is situated behind the first edge region, so that coating material fills the cavity and, in so doing, forms a protective layer, which covers the airbag deployment opening, wherein the latter is situated on a first surface of the fabric part, such that it is situated in the cover section on the visible side and in the fixing section for the fastening thereof on the deployment channel wall between the fixing section and the deployment channel wall.

14. The method according to claim 13, wherein with the fastening of the fabric part, the fabric part is situated with a first edge section on an outer edge section of the end of the deployment channel wall projecting from the base body.

15. The method according to claim 13, wherein with the fastening of the fabric part, a positioning strip is fastened on a first end thereof, which positioning strip is applied to an outer edge section of the end of the deployment channel wall projecting from the base body, in order to align the fabric part with the deployment channel wall.

16. The method according to claim 13, wherein a decoration layer is held on the second tool part and the cavity existing with the tool parts moved together is formed in the region of the deployment opening by surfaces of the fabric part and of the decoration layer facing one another.

17. The method according to claim 13, wherein the first tool part comprises projections which form depressions into the decoration layer, when the tool parts are in the moved-together state.

\* \* \* \* \*